United States Patent [19]
Dower

[11] Patent Number: 6,059,058
[45] Date of Patent: May 9, 2000

[54] MODULAR VEHICLE CONSTRUCTION AND TRANSPORTATION SYSTEM

[76] Inventor: Gordon E. Dower, P.O. Box 1939, Point Roberts, Wash. 98281

[21] Appl. No.: 08/922,385

[22] Filed: Sep. 3, 1997

[51] Int. Cl.$^7$ .................................................. B60K 1/00
[52] U.S. Cl. ........................ 180/65.3; 180/65.8; 180/298; 180/89.17; 180/312
[58] Field of Search .................................. 180/65.1, 65.6, 180/65.3, 65.8, 298, 299, 89.1, 89.17, 89.18, 312, 311

[56] References Cited

U.S. PATENT DOCUMENTS

| | | | |
|---|---|---|---|
| 2,978,053 | 4/1961 | Schmidt | 180/65.1 |
| 4,217,970 | 8/1980 | Chika | 180/298 |
| 4,967,864 | 11/1990 | Boyer et al. | 180/65.1 |
| 5,036,938 | 8/1991 | Blount et al. | 180/65.1 |
| 5,251,721 | 10/1993 | Ortenheim | 180/298 |
| 5,806,622 | 7/1998 | Murphy | 180/65.1 |

*Primary Examiner*—Richard M. Camby
*Attorney, Agent, or Firm*—Terrance L. Siemens

[57] ABSTRACT

A modular vehicle comprises a preassembled undercarriage module, a preassembled overcarriage module, and coupling means for releasably coupling the overcarriage module to the undercarriage module. The undercarriage module includes wheels for permitting travel of the vehicle on a travelling surface, means for holding a power source for supplying operating power to the vehicle, and means for directing controlled motive power from the power source to at least one of the wheels. The overcarriage module includes control means linkable with the undercarriage module for controlling operation of the vehicle. When the power source associated with a first undercarriage module is in need of maintenance service, there is provided a method of handling an overcarriage module coupled to the first undercarriage module comprising the steps of decoupling and separating the two modules; then releasably coupling the overcarriage module to a second one of such undercarriage modules, the associated power source of the second undercarriage module not being in need of maintenance service; then operating the overcarriage module and the second undercarriage module together as a vehicle while providing the maintenance service required by the power source of the first undercarriage module.

17 Claims, 8 Drawing Sheets

MODULAR VEHICLE CONSTRUCTION AND TRANSPORTATION SYSTEM

FIELD OF THE INVENTION

The present invention relates to the modular construction of vehicles such as automobiles, vans, trucks, buses and the like. As well, the present invention relates to transportation systems utilizing vehicles having a modular construction. The modular vehicle construction and related transportation system are considered particularly suitable for but not limited to cases where the vehicles concerned are electric vehicles.

BACKGROUND TO THE INVENTION

In the early years of this century, electric vehicles were a worthy candidate for city transportation. Their quiet elegance compared favorably to the hand-cranking, noisy and temperamental nature of their rivals powered by the internal combustion engine. Today, however, while considerable effort has been directed to the development of cost-effective, high energy density, power sources for electric vehicles, their ability to compete with the refined, powerful and protean internal combustion vehicles which now meet our needs remains limited at best. The driving range offered by a tankful of gasoline is significant, even when providing power for heat, air-conditioning and other comforts of the modern vehicle (e.g. stereo, telephone, etc.). Despite the environmental advantages offered by electric vehicles, their limited driving range and relatively high cost remain an impediment to their acceptance.

Environmental concerns are becoming paramount in various jurisdictions. Accordingly, there is a continuing effort to develop electric vehicles which will meet or surpass the rigorous environmental standards which are being set, with a convenience for the user which matches that of vehicles powered by internal combustion engines.

A considerable amount of this effort has been devoted to vehicles which are powered by batteries. In this regard, a useful summary on costs, driving range and other considerations is provided in a paper by Ronald Doctors of GMI Inc, Santa Barbara, Calif., entitled "A Systems Approach To Battery Powered Vehicles". Here, it is indicated that factors such as battery weight, battery cost, limited driving range, recharging and other battery maintenance needs, can be a serious deterrent to acceptance by the driving public. These disadvantages are noted with respect to conventional electric vehicles where the battery is intended to stay in the vehicle as an integral part. The need for battery maintenance leads to prolonged periods during which a vehicle is unserviceable.

To lessen the problem, Doctors proposes a system using battery modules which are smaller than integrated batteries, but which allow discharged modules to be quickly exchanged for freshly charged modules merely by driving into a battery exchange center. The exchange centers are staffed and equipped to handle battery recharge and maintenance in an expert manner thus relieving the vehicle owner of such concerns.

The proposal by Doctors has merit. However, it represents a partial solution at best. The driving range with the relatively small modular batteries which he proposes is limited. Accordingly, battery exchange would be required at frequent intervals. In an example which he gives for the California driver averaging about 40 miles per day, battery exchange would be required daily. On the basis that the exchange would take only 30 seconds, he does not see this as a problem. However, 30 seconds surely ignores the amount of time that it takes to drive to and from an exchange center. Further, the repeated installation and removal of batteries, even in a modular form, will attract maintenance, safety and other operational problems of their own. A battery exchange center may provide excellent servicing for battery modules, but the modules, their corresponding receptacles in the vehicles, and electrical interconnections between the modules and the receptacles (the latter of which may be serviced infrequently or sporadically) will be at increased risk of abuse, damage or deterioration with repeated battery exchange.

Battery exchange centers with a degree of automation have been proposed by others: see for example U.S. Pat. No. 4,343,533 (Hane) granted on Aug. 3, 1982 and U.S. Pat. No. 5,549,443 (Hammerslag) granted on Aug. 27, 1996. However, the utility of such centers appears to depend upon standardization in the positioning of batteries or battery modules within the vehicles and in the means of access and egress for the purpose of installation and removal. Further, the utility of such centers may depend upon elaborate systems for the handling of batteries or battery modules once they have been removed: see also U.S. Pat. No. 4,334,819 (Hammerslag) granted on Jun. 15, 1982, and U.S. Pat. No. 4,450,400 (Gwyn) granted on May 22, 1984.

SUMMARY OF THE INVENTION

In accordance with a broad aspect of the present invention, there is provided a modular vehicle for providing transportation comprising a preassembled undercarriage module, a preassembled overcarriage module, and coupling means for releasably coupling the overcarriage module to the undercarriage module. The undercarriage module includes wheels for permitting travel of the vehicle on a travelling surface, means for holding a power source for supplying operating power to the vehicle, and means for directing controlled motive power from the power source to at least one of the wheels. The overcarriage module includes control means linkable with the undercarriage module for controlling operation of the vehicle.

Herein, it is to be understood that the term overcarriage module means a module for carrying one or more individuals, or cargo, or both one or more individuals and cargo.

The foregoing vehicle construction particularly lends itself to the rapid substitution and use of differing overcarriage modules with a given undercarriage module and, conversely, to the rapid substitution and use of differing undercarriage modules with a given overcarriage module. Thus, if the power source associated with a given undercarriage module is in need of maintenance service, then a given overcarriage module presently coupled to the given undercarriage module need not remain unserviceable. In this regard, and in accordance with another aspect of the present invention, there is provided a method of handling a first overcarriage module coupled to a first undercarriage module comprising the steps of:

decoupling and separating the two modules; then, releasably coupling the first overcarriage module to a second one of the undercarriage modules, the associated power source of the second undercarriage module not being in need of maintenance service; then operating the first overcarriage module and the second undercarriage module together as a vehicle;

providing the maintenance service required by the associated power source of the first undercarriage module Once the first overcarriage module is coupled to the second undercarriage module, the resulting vehicle may be driven away. In the meantime, the maintenance service required by the power source of the first undercarriage module may be completed. When such servicing is complete, then the first undercarriage module may be coupled with a second overcarriage module and operated together as a vehicle.

Ultimately, it is contemplated that the greatest advantages which stand to be realized from the foregoing vehicle construction and methodology will be realized with electric vehicles, and in particular with electric road vehicles such as automobiles, vans, trucks, buses and the like which use rechargeable batteries as the source of motive power for the vehicle. The present invention enables many of the handling problems which are associated with conventional battery exchange to be avoided. If a battery or battery module requires minor servicing such as battery recharge, then it may remain in place in the undercarriage module while such servicing takes place. Yet, as noted above, the overcarriage module may be decoupled and remain serviceable together with another undercarriage module.

To economically facilitate the present invention for the average vehicle owner, it is recognized that a transportation system comprising a reliable network of module exchange sites within driving distance of each other will likely be required before general acceptance can be achieved. Vehicle owners may own individual overcarriage modules while renting differing undercarriage modules. However, pending the establishment of such a network and acceptance, the present invention is considered to have application in more limited spheres. For example, in catering to the needs of local drivers, businesses such as taxi companies and vehicle rental agencies may have a single location where modules in a fleet of the same or differing carriages and common undercarriages may be exchanged and serviced. In the case of vehicle rental agencies, the ability to couple a given overcarriage module with any one of a number of undercarriage modules is particularly advantageous because the given overcarriage module when in demand by a customer need not be unserviceable merely because the power source is unserviceable.

In a preferred embodiment of modular vehicle construction in accordance with the present invention, the overcarriage module includes a plurality of support members for supporting the overcarriage module on an underlying support means when it is decoupled from the undercarriage module. Advantageously, the support members may each comprise a support arm and a wheel mounted thereto for riding on a pair of spaced rails which is designed to provide the underlying support and to facilitate handling of the overcarriage module at module exchange sites. Preferably, the support members are movable between an extended position extending outwardly from the overcarriage module and a retracted position.

In a preferred method of module exchange in accordance with the present invention, a second undercarriage module is exchanged for a first undercarriage module by a method comprising the steps of driving the first undercarriage module with an overcarriage module coupled thereto to an exchange site; then decoupling the overcarriage module from the first undercarriage module; then separating the overcarriage module and the first undercarriage module to permit coupling alignment between the overcarriage module and the second undercarriage module; then positioning the overcarriage module and the second undercarriage module in coupling alignment; then releasably coupling the overcarriage module to the second undercarriage module; then driving the second undercarriage module with the overcarriage module coupled thereto away from the exchange site. When the overcarriage module includes wheeled support members for riding on a pair of rails as described above, the step of separating the overcarriage module from the first undercarriage module may advantageously comprise the steps of aligning the support member wheels to ride a pair of such rails situate at the exchange site, then advancing the overcarriage module on the rails while progressively vertically separating the overcarriage module from its couple position with the first undercarriage module. Ultimately, the overcarriage module and the first undercarriage module become completely separated. While the overcarriage module remains supported on the rails, the first undercarriage module may then be moved from beneath, and the second undercarriage module may then be moved into the position previously occupied by the first undercarriage module.

The foregoing and other features and advantages of the present invention will now be described with reference to the drawings.

DETAILED DESCRIPTION OF PREFERRED EMBODIMENTS

Figure 1A:
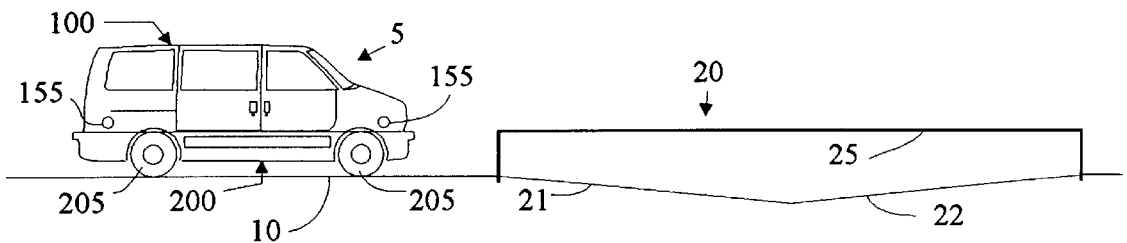
FIG. 1, consisting of FIGS. 1A to 1H, is a progression of side elevation views illustrating a modular vehicle having an overcarriage module and an undercarriage module in accordance with the present invention, and the exchange, in accordance with a method of the present invention, of a first undercarriage module for a second undercarriage module.

FIG. 1 depicts a modular vehicle generally designated 5 which comprises a preassembled overcarriage module generally designated 100 and a preassembled undercarriage module generally designated 200.

Undercarriage module 200 includes road wheels 205 for permitting vehicle travel on a travelling surface 10. Further, and as is described below in more detail, undercarriage module 200 includes a power source for supplying operating power to the vehicle, and means for directing controlled motive power from the power source to the wheels.

Overcarriage module 100 has the style of a van and is designed to carry a driver, passengers and cargo. However, it will be readily apparent that module 100 alternatively may be designed to have the style of an automobile, a truck, a bus, or any of a wide variety of possible styles depending upon the desired purpose of the vehicle.

Figure 1B:
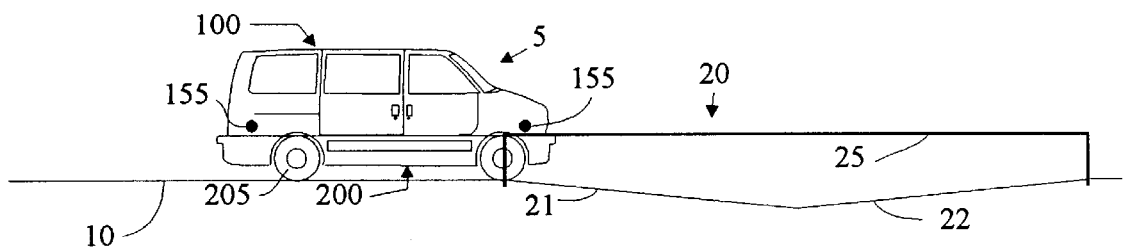

In FIG. 1A, vehicle 5 is shown in its normal driving condition as it approaches the position shown in FIG. 1B. In this condition, and as is described below in more detail, overcarriage module 100 is releasably coupled to undercarriage module 200.

In FIG. 1B, vehicle 5 is shown with a pair of rail wheels 155 now extended outwardly from overcarriage module 100 to align with and ride on one rail of a pair of horizontally spaced rails 25 situate at a module exchange site generally designated 20. A corresponding pair of wheels 155 (not shown in FIG. 1) is extended outwardly from the opposite side of overcarriage module 100 to align with and ride on a corresponding one of the rails (which is hidden from view in FIG. 1). Vehicle 5 has been driven between the rails.

Under normal driving conditions, rail wheels 155 are retracted within the body of overcarriage module 100. In FIG. 1, the retracted position is graphically indicated by open circles and the extended position is graphically indicated by solid circles.

When vehicle 5 is in the position shown in FIG. 1B, overcarriage module 100 is then decoupled from undercarriage module 200. However, while the modules are decoupled, they are not yet separated.

The process of separation begins as vehicle 5 moves or is moved forwardly between the rails. Undercarriage module 200 then begins to travel down ramp 21 situate at exchange site 20. Meanwhile, overcarriage module 100 rides on rails 25 and continues to travel horizontally along with undercarriage module 200.

Figure 1C:
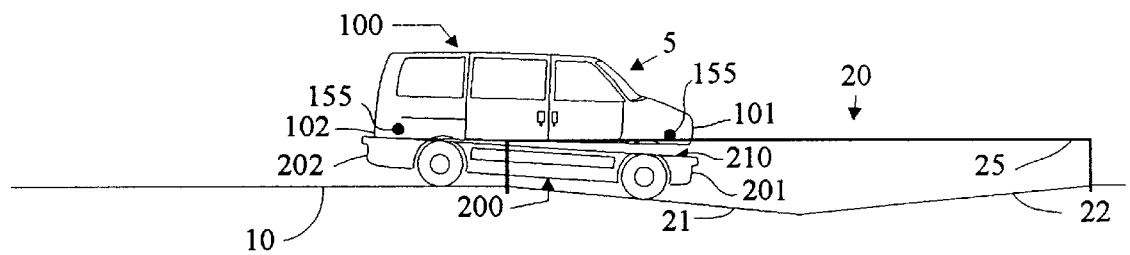
Figure 1D:
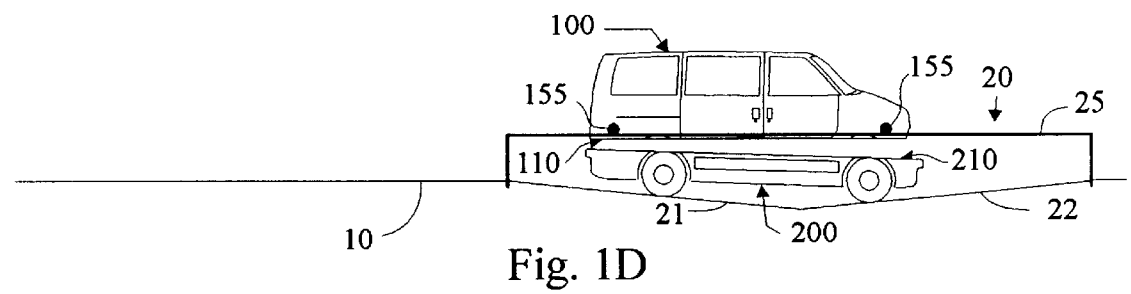

In FIG. 1C, and while vehicle 5 has continued to move forwardly, modules 100 and 200 have become partially vertically separated. Forward ends 101, 201 of the modules are completely separated while rearward ends 102, 202 remain together. In FIG. 1D, the forward movement of both modules has continued and the modules are now completely vertically separated. Thus, it will be appreciated that, as overcarriage module 100 has advanced on rails 25, it has progressively vertically separated from its coupled position with undercarriage module 200.

Beginning with FIG. 1D, it will be noted that there is a now visible triangular shaped rear hook 110 depending downwardly from the rearward end of overcarriage module 100. As is described below in more detail, hook 110 is engaged by the rearward end of undercarriage module 200 until modules 100 and 200 have become vertically separated as shown in FIG. 1D. Thus, as undercarriage module moves forwardly down ramp 21 from the position shown in FIG. 1B to the position shown in FIG. 1D, it effectively drags overcarriage module 100 along rails 25.

Figure 1E:
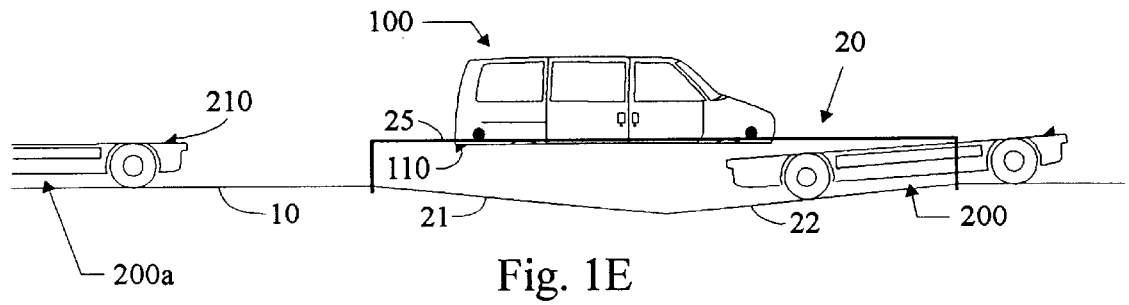

Once modules 100 and 200 have been vertically separated then, as shown in FIG. 1E, undercarriage module 200 continues to move forwardly progressing up ramp 22 and from beneath overcarriage module 100. Concurrently, a second undercarriage module generally designated 200a is brought forward to be moved beneath overcarriage module 100. Meanwhile, overcarriage module 100 remains in place supported on rails 25 in the position shown in FIG. 1D.

Undercarriage modules 200 and 200a are basically identical in construction. Each includes a triangular shaped front hook 210 which extends upwardly from the forward end of the module and which is adapted to engage not only the corresponding forward end of overcarriage module 100 but also rear hook 110 of overcarriage module 100.

Figure 1F:
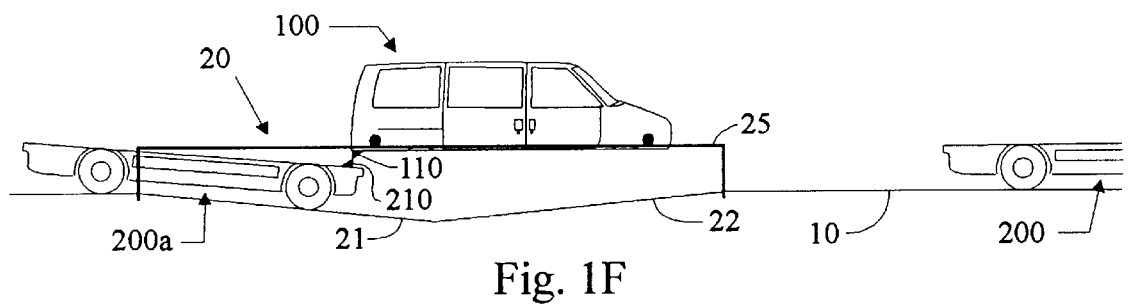

More particularly, as undercarriage module 200a moves from the position shown in FIG. 1E to the position shown in FIG. 1F, its front hook 210 first advances into abutment with rear hook 110 of overcarriage module 100. Then, as undercarriage module 200a continues to move forward, overcarriage module 100 is pushed along rails 25 from the position shown in FIG. 1E to the position shown if FIG. 1F. At this point, and because undercarriage module 200a has been moving down ramp 21, hook 210 of the module slips away from abutment with hook 110 of overcarriage module 100. Overcarriage module 100 then remains in the position shown in FIG. 1F while undercarriage module 200a moves forwardly to the position shown in FIG. 1G.

Figure 1G:
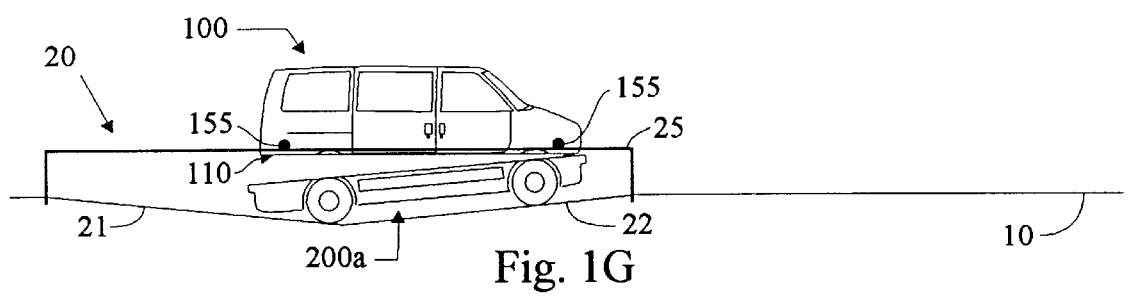

In the position shown in FIG. 1G, undercarriage module 200a has moved up ramp 22 to a point where front hook 210 engages forward end 101 of overcarriage module 100. From this point, overcarriage module 100 is pulled forwardly on rails 25 by undercarriage module 200a. As the forward movement continues, both modules are vertically drawn together until they are fully aligned for the purpose of coupling. Then, as overcarriage module leaves rails 25, rail wheels 155 are retracted and overcarriage module 100 is releasably coupled to undercarriage module 200a.

Figure 1H:
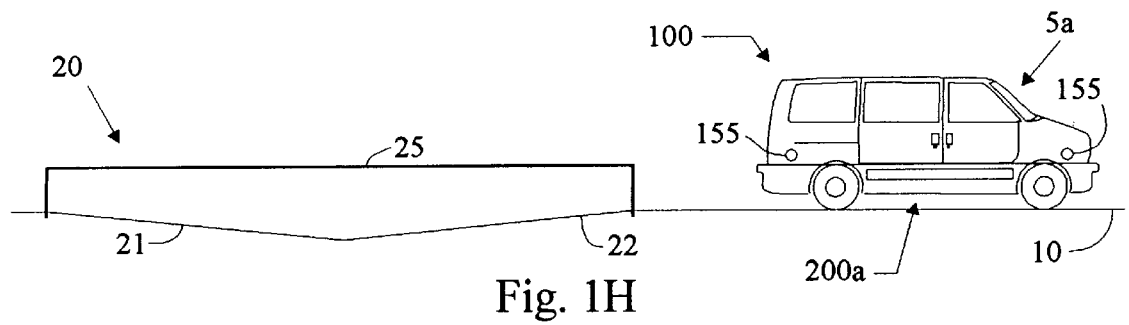

Thereafter, and as indicated in FIG. 1H, overcarriage module 100 and undercarriage module 200a may be operated together as a vehicle 5a and may be driven away from exchange site 20. In the meantime, any maintenance needs of undercarriage module 200 can receive required attention. For example, in cases where the power source in undercarriage module 200 is a rechargeable battery, the required maintenance may be battery recharge. Advantageously, however, the serviceability of overcarriage module 100 is not impaired while such recharge takes place. Further, when the battery is recharged, then undercarriage module 200 is available at the exchange site for exchange either with undercarriage module 200a when it subsequently requires maintenance or with the undercarriage module of another modular vehicle like vehicle 5 or 5a.

In the foregoing method of module exchange which utilizes ramps 21, 22 and rails 25, and which includes rail wheels 155 and hooks 110, 210 to perform active functions during module exchange, it will be understood that the progressive forward movements of undercarriage modules 200, 200a through exchange site 20 may be achieved under their own power or, alternately, by towing the undercarriage modules through exchange site 20 with suitable towing means (not shown). Such progressive movements are considered as a desirable to simplify the process of module exchange. However, those skilled in the art will also understand that other methods of module exchange which do not require the use of ramps or rails or elements such as rail wheels 155 or hooks 110, 210 are possible.

For example, a module exchange site may be designed to grapple a decoupled overcarriage module 100 from above, then to lift it away from an undercarriage module 200. Undercarriage module 200 may then be moved away. Then, an undercarriage module 200a may be positioned beneath the grappled overcarriage module which is subsequently lowered thereon and releasably coupled thereto. With such an arrangement, the overcarriage module would include suitable means to be engaged by the grapple.

The grappling method of module exchange briefly noted above and the preferred method utilizing rails 25 and rail wheels 155 both contemplate that the overcarriage and undercarriage modules may be separated or moved apart vertically once the two modules are decoupled. Of course, arrangements may be devised which would first require the overcarriage module to be moved horizontally with respect to the undercarriage module, or first horizontally then vertically, to achieve complete separation. However, it is believed that such arrangements would be more complicated or more difficult to implement at a module exchange site.

Structural features of overcarriage module 100 and undercarriage module 200 will now be described in more detail.

Figure 2:
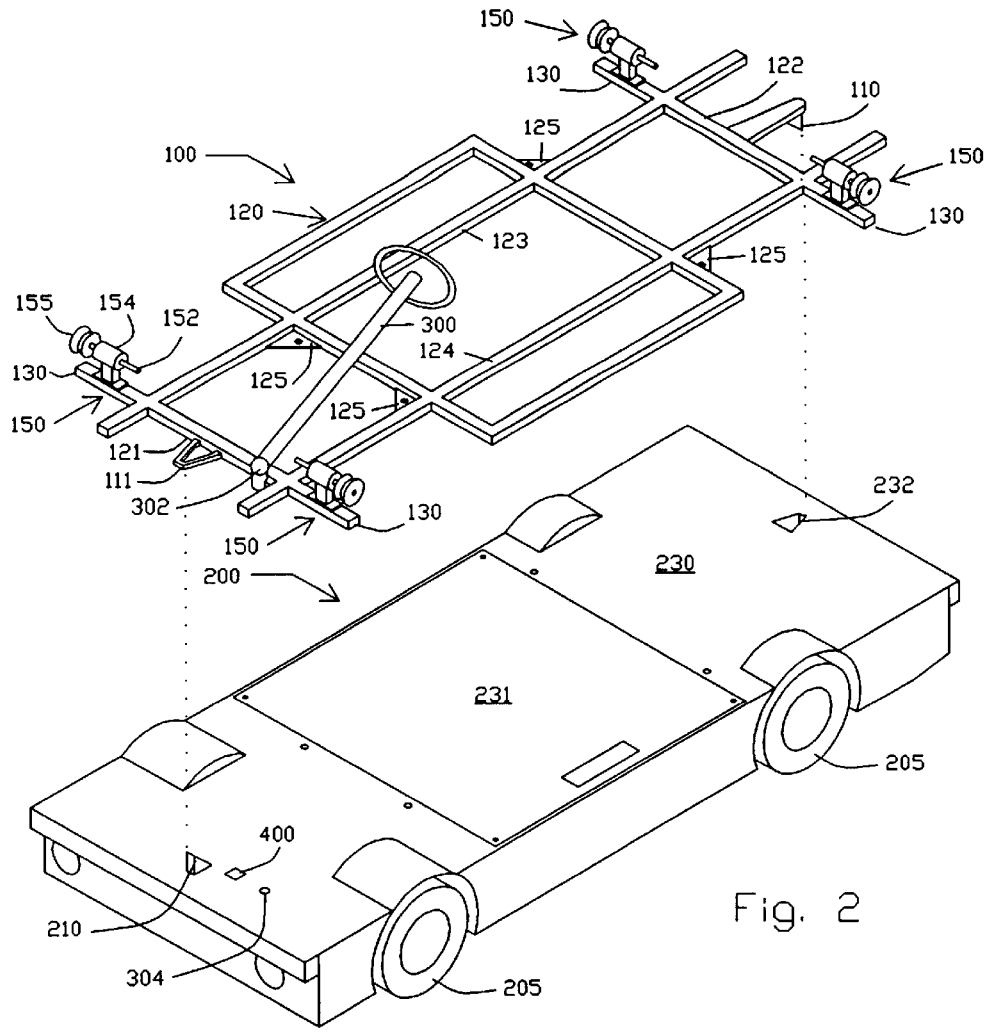
FIG. 2 is an exploded isometric view illustrating the undercarriage module of the vehicle shown in FIG. 1 and framework of the overcarriage of the vehicle shown in FIG. 1.

Referring to FIG. 2, overcarriage module 100 is shown positioned above and in vertical alignment to be lowered and releasably coupled with undercarriage module 200. Overcarriage module 100 includes a framework or chassis generally designated 120 with forward and rearward frame members 121, 122 extending transversely between longitudinal frame members 123, 124. For clarity of illustration, the van shaped body of overcarriage module 100 depicted in FIG. 1 is not depicted in FIG. 2. Likewise, a means of connecting the body to the chassis is not depicted. As is well known to those skilled in the art there are various suitable means for connecting a vehicle body to a supporting frame or chassis.

Overcarriage module 100 also includes four support members generally designated 150 for supporting the module on an underlying support means such as rails 25 shown in FIG. 1. Each support member 150 comprises a support arm 152 which extends through a housing 154, the latter being mounted to a corresponding frame extension 130 extending transversely outward from chassis 120. A rail wheel 155 as described above with reference to FIG. 1 is mounted at the outward end of each support arm 152 for riding on rails 25.

In FIG. 2, each support member 150 is shown in a retracted position. That is, each support arm 152 is drawn inwardly through its corresponding housing 154 to a point where the outer face of the corresponding rail wheel 155 will not protrude outside the vehicle body (not shown) normally mounted to chassis 120. The retracted position is a normal driving position. However, as discussed above in relation to FIG. 1, rail wheels 155 are extendable outwardly from overcarriage module 100 to align with and ride on supporting rails at a module exchange site.

Figure 4:
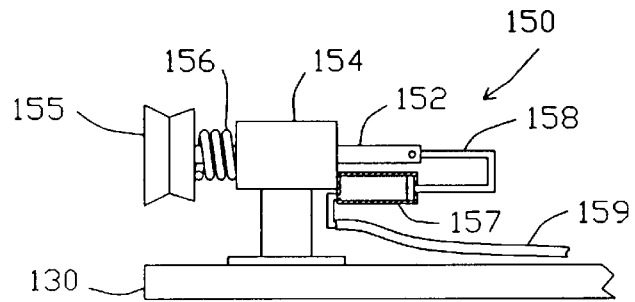
FIG. 4 is a front elevation view illustrating the retracted position of one of four support members forming part of the overcarriage module shown in FIG. 2.
Figure 5:
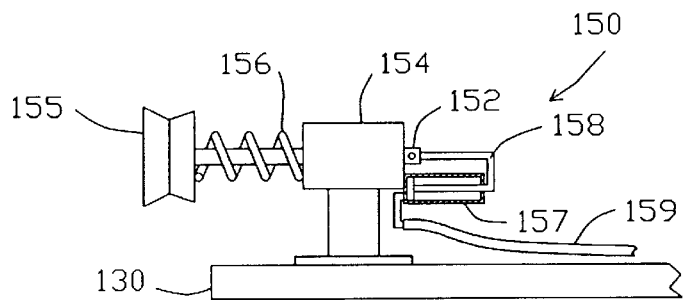
FIG. 5 is a front elevation view illustrating the extended position of the support member shown in FIG. 4.

The retracted and extended positions of support members 150 are illustrated in more detail in FIGS. 4 and 5, respectively. Each support member 150 includes an associated spring 156 which bears from housing 154 against the associated rail wheel 155. As well, support member 150 includes an associated hydraulic cylinder 157 the piston arm end of which cylinder is coupled by a mechanical linkage 158 to support arm 152. The opposed end of cylinder 157 is hydraulically coupled by an associated hydraulic line 159 to an hydraulic cylinder 270 of an associated coupling mechanism described below in relation to FIG. 7.

When hydraulic line 159 is unpressurized, then spring 156 will force rail wheel 155 with support arm 152 to the extended position shown in FIG. 5. Moving concurrently with movement of support arm 152, linkage 158 will force the piston within hydraulic cylinder 157 to the full stroke position shown in FIG. 5. When hydraulic line 159 is subsequently pressurized sufficiently to overcome the strength of spring 156 (and incidental frictional resistance), then the piston within hydraulic cylinder 157 will be forced to the position shown in FIG. 4. Moving concurrently with movement of the piston, linkage 158 will draw on support arm 152 to pull the support arm and rail wheel 155 to the retracted position shown in FIG. 4.

Figure 3:
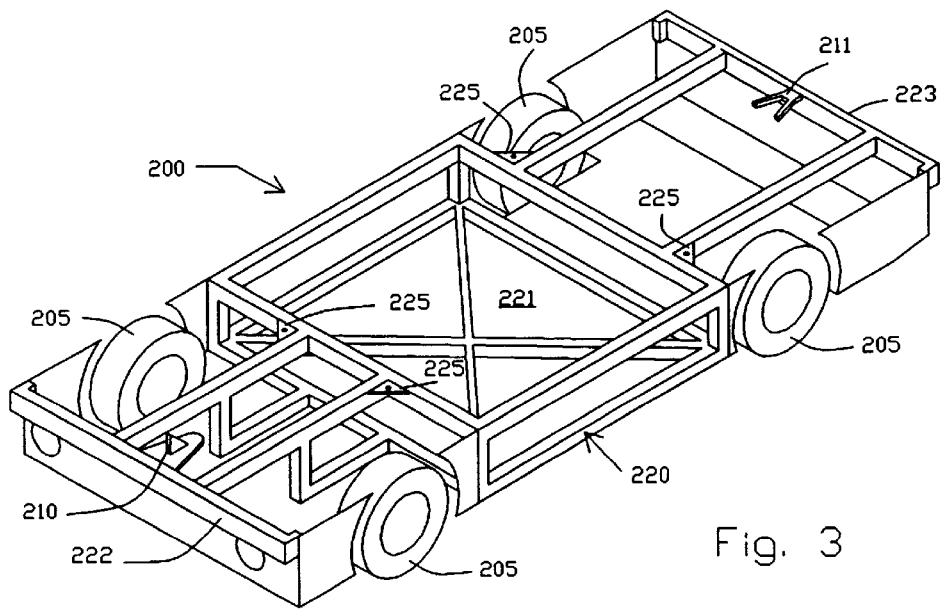
FIG. 3 is an isometric view of the undercarriage module shown in FIG. 2 with the top cover removed to illustrate framework thereof.
Figure 6:
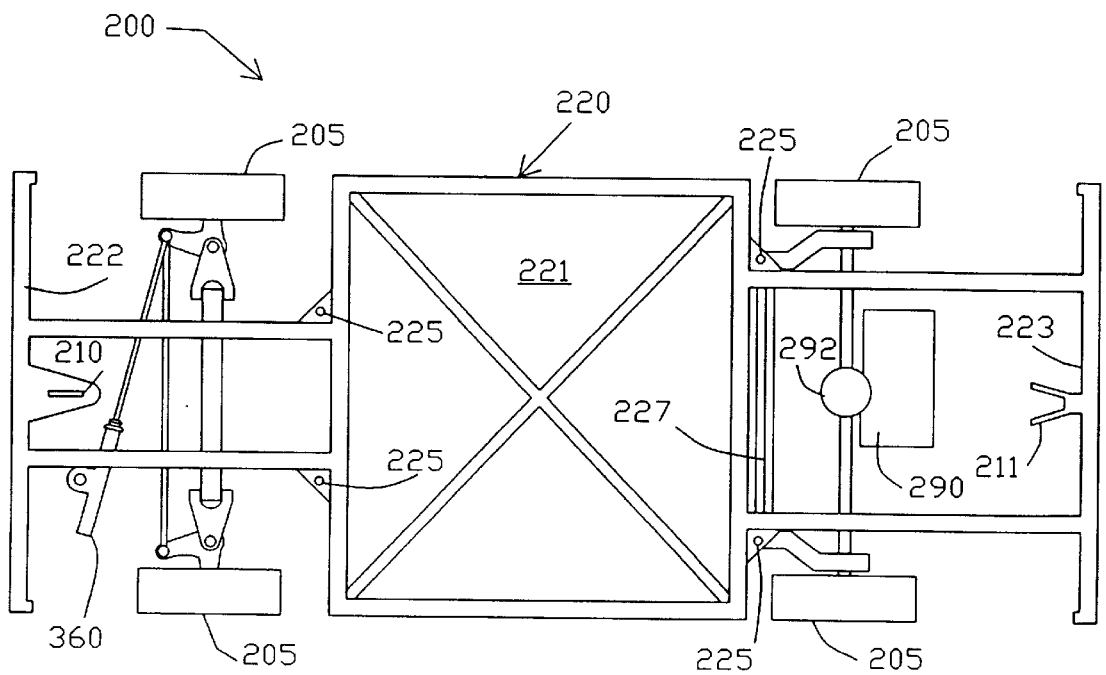
FIG. 6 is a top view of the undercarriage module shown in FIG. 3.

Referring now to FIGS. 2, 3 and 6, undercarriage module 200 includes a framework or chassis generally designated 220 (FIGS. 3, 6) which is normally covered by a top cover 230 (FIG. 2). As depicted in FIG. 6, but not FIG. 3, a conventional rear torsion-bar suspension 227 and a conventional rack and pinion steering system 360 form part of the module.

Cover 230 includes an inset central section 231 which is easily removable to allow access to a central compartment 221 defined by chassis 220. Compartment 221 is configured for the purpose of holding a rechargeable battery power source (not shown) for supplying operating power to vehicle 5 (FIG. 1). Under typical driving conditions, a substantial part of the available power is directed in a conventional manner to electric vehicle motor 290 which provides motive power to the rear pair of road wheels 205 through transmission 292.

Front hook 210, which is centrally mounted to frame member 222 of chassis 220, protrudes upwardly through an opening in the forward end of cover 230 and is positioned to register with hook receptacle 111 centrally mounted to frame member 121 of chassis 120. Rear hook 110, which is centrally mounted to frame member 122 of chassis 120, is positioned to protrude downwardly through rear opening 232 in cover 230 and then to register with receptacle 211 centrally mounted to frame member 223 of chassis 220.

As will also be noted from FIGS. 2 and 3, overcarriage module 100 includes four triangular plates 125 mounted at junctions between the central and forward and rearward sections of chassis 120. Likewise, undercarriage module 200 includes four similar plates 225 mounted at similar junctions of chassis 220. Plates 225 mark the sites in undercarriage module 200 of four coupling mechanisms (not shown in further detail in FIG. 3, but shown and discussed below in more detail in relation to FIG. 7) which form part of a coupling means for releasably coupling overcarriage module 100 to undercarriage module 200. Plates 125 align with plates 225 to provide points of engagement when the modules are coupled.

Figure 7:
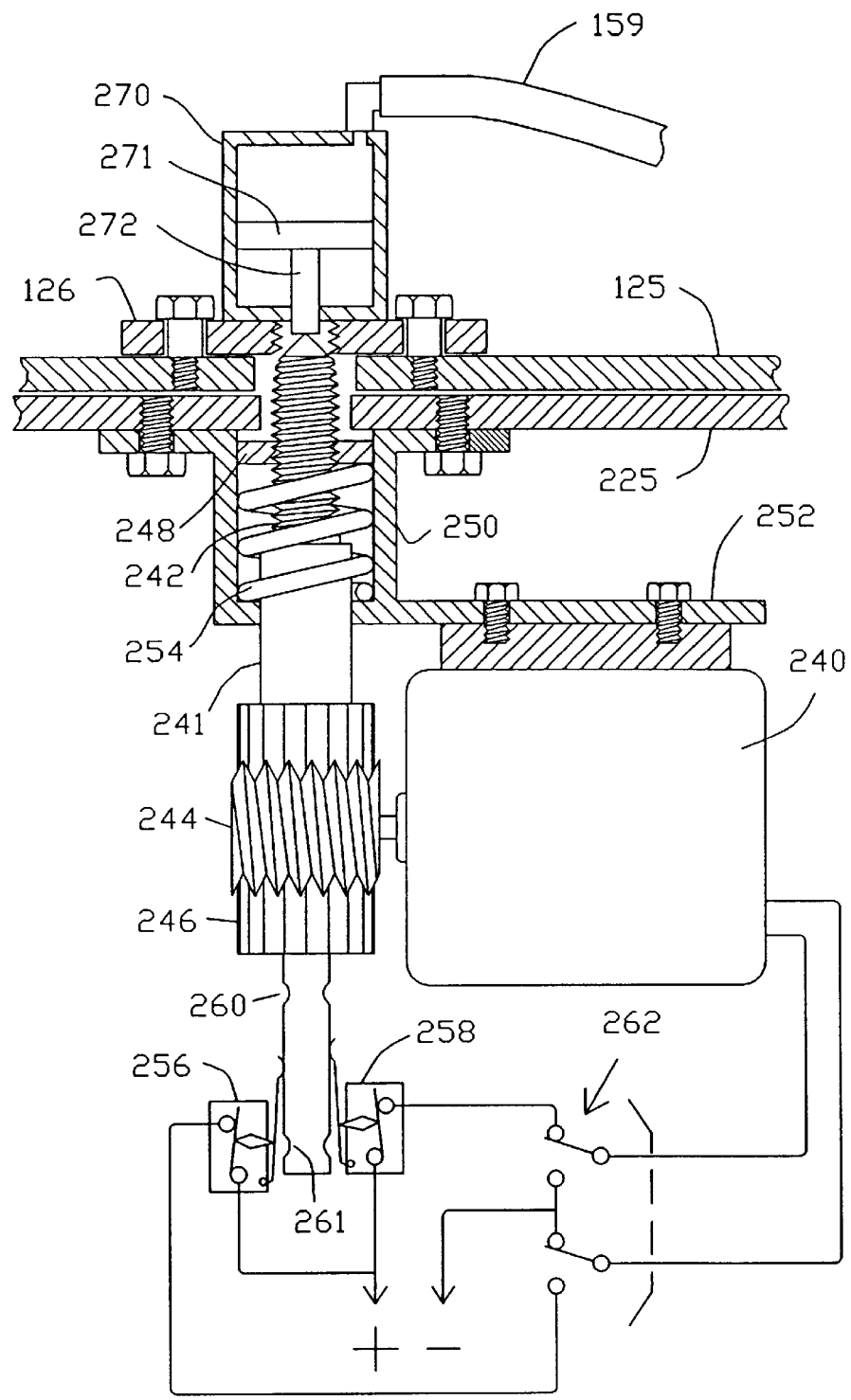
FIG. 7 is an elevation view, partially cut-away, and partially diagrammatic, of a coupling means for releasably coupling the overcarriage module shown in FIG. 2 to the undercarriage module shown in FIG. 2.

FIG. 7 shows one of the four coupling mechanisms, the other three being essentially the same. The coupling mechanism includes an electric motor 240 which turns a bolt shaft 241 through worm and pinion gears 244, 246. Worm gear 244 is mounted on a shaft extending from motor 240. Pinion gear 246 is mounted to bolt shaft 241. When shaft 241 is turned in a clockwise direction, locking bolt 242 at its upper end threads through a floating nut 248 which is free to move up and down but which cannot turn within housing 250. Housing 250 is bolted to the bottom of plate 225 and includes an extension plate 252 to which motor 240 is bolted. Nut 248 is biased by a spring 254 such that, as bolt 242 turns, bolt 242 is raised by the spring within housing 250 toward a locking nut 126 affixed by bolts to plate 125 of overcarriage module 100. When bolt 242 and nut 126 engage, shaft 241 is pulled up until the top of pinion gear 246 reaches the bottom of housing 250. As motor 240 continues to turn, overcarriage module 100 is cinched and firmly locked to undercarriage module 200.

Motor 240 receives operating power from a DC power source (not shown) located in undercarriage module 200. Generally, it is contemplated that this power source will comprise the rechargeable battery power source noted above together with such power conditioning means (not shown) as may be required to suit the input voltage requirements of the motor. Microswitches 256, 258 (which are controlled by annular grooves 260, 261 in the lower end of shaft 241) serve to shut off motor 240 when locking bolt 242 reaches its upper and lower limit positions, respectively. Activation of motor 240 to begin excursions between these limits is brought about by a double-pole, double-throw switch generally designated 262 which serves to switch the polarity of the input voltage to the motor as supplied through the microswitches.

As can also be seen in FIG. 7, a hydraulic cylinder 270 is positioned immediately above locking nut 126. Cylinder 270 includes a piston 271 and piston rod 272 in longitudinal alignment with the longitudinal axis of locking bolt 242. When locking bolt 242 is screwed downwardly from the position shown in FIG. 7 such that its tip does not bear against the lower end of rod 272, then hydraulic pressure in hydraulic line 159 which is coupled to the top of cylinder 270 will force piston 271 to the bottom of cylinder 270. As described above in relation to FIG. 5, such pressure is produced by the action of spring 156 of an associated support member 150 in overcarriage module 100. When bolt 242 is screwed upwardly and bears against the lower end of rod 272, then pressure is applied to cylinder 270 in the opposite direction. Such opposite pressure is sufficient to overcome that produced by spring 156. Accordingly, as bolt 242 threads through locking nut 126 to couple overcarriage module 100 with undercarriage module 200, it also serves to move the associated support member 150 from the extended position shown in FIG. 5 to the retracted position shown in FIG. 4.

Overcarriage module 100 includes control means linkable with undercarriage module 200 for controlling operation of the vehicle defined when the modules are coupled. As will be readily appreciated by those skilled in the art, various mechanical and/or electrical means may be devised for this purpose. Other means such as an optical linkage may also may be devised. Preferably, the linkage should occur in a substantially seamless or automatic manner as the modules are coupled.

Example 1—Steering Control Linkage

Modular vehicle 5 is designed as a road vehicle and as such obviously requires a steering mechanism. Presupposing that the vehicle is steered by a driver from within overcarriage module 100 and not by remote control, then a steering control linkage will be normally required between overcarriage module 100 and undercarriage module 200.

But for the required linkage between modules, the steering mechanism as a whole is conventional. More particularly, overcarriage module 100 includes a conventional steering wheel and column assembly 300 as shown in FIG. 2. Undercarriage module 200 includes a further conventional part of the steering mechanism as noted above in relation in FIG. 6. The linkage between the modules which occurs when the modules are coupled is shown in FIG. 8.

Figure 8:
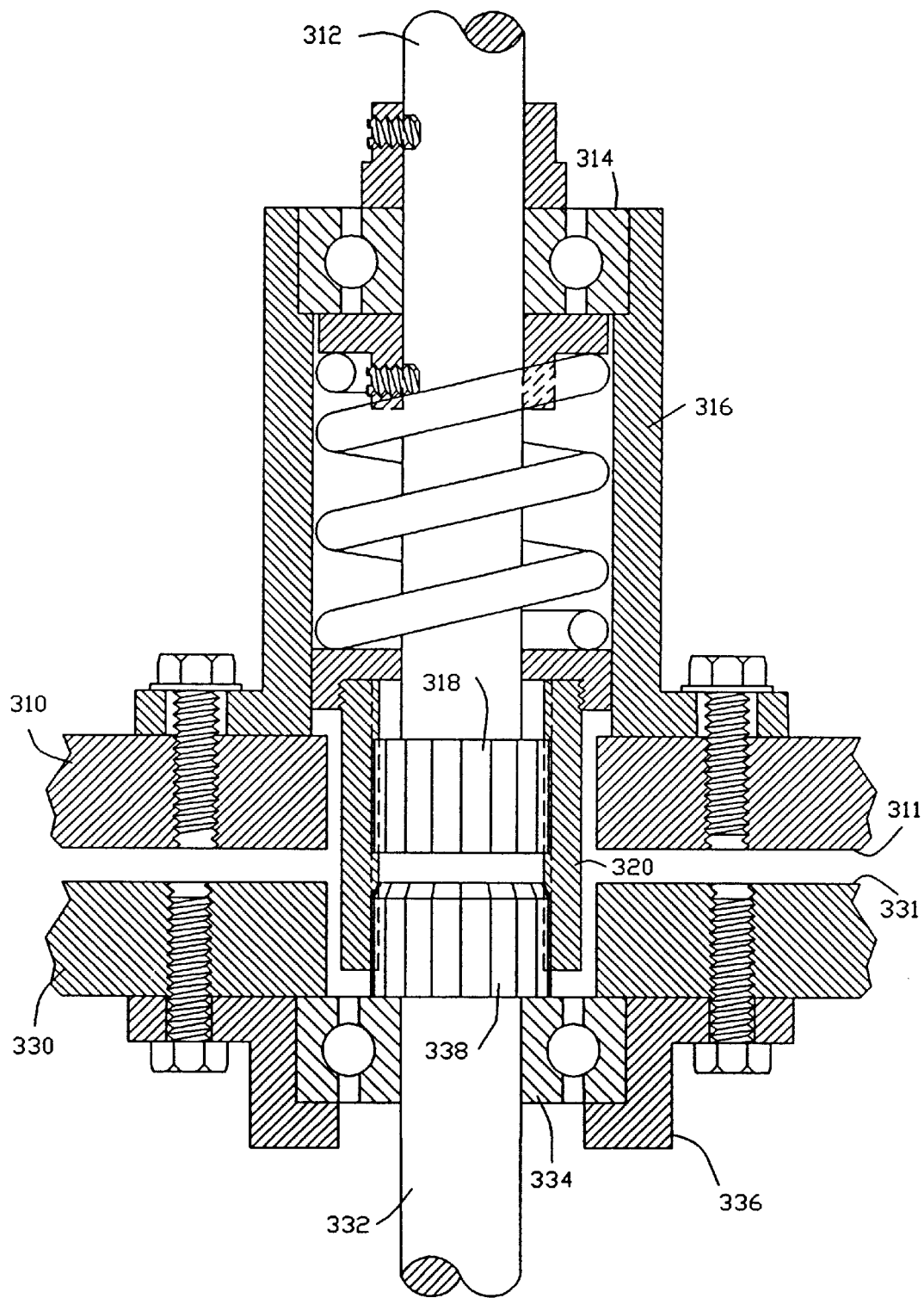
FIG. 8 is an elevation view, partially cut-away, of a steering control linkage between the overcarriage module shown in FIG. 2 to the undercarriage module shown in FIG. 2.

The steering control linkage shown in FIG. 8 includes and is generally supported by an upper plate 310 mounted to frame 120 (not shown in FIG. 8) of overcarriage module 100 and by a lower plate 330 mounted to frame 220 (also not shown in FIG. 8) of undercarriage module 200. Lower surface 311 of plate 310 lies substantially flush with the lower surface of frame 120. Similarly, upper surface 331 of plate 330 lies substantially flush with the upper surface of frame 220. Thus, surfaces 311, 331 are spaced by approximately the thickness of cover 230 shown in FIG. 2.

An overcarriage shaft 312 supported for rotation by bearing 314 extends downwardly through housing 316 bolted to upper plate 310. The upper end (not shown) of shaft 312 is connected to steering wheel and column assembly 300 by means of a universal joint 302 depicted in FIG. 2. The lower end of shaft 312 terminates in a male splined gear 318 which is engaged with a spring loaded female splined annular gear 320.

An undercarriage shaft 332 supported for rotation by bearing 334 extends upwardly through housing 336 bolted to lower plate 330 and is longitudinally aligned with shaft 312. The lower end (not shown) of shaft 332 is coupled to rack and pinion steering system 360 shown in FIG. 6. The upper end of shaft 332 terminates in a male splined gear 338. Like gear 318, gear 338 is also engaged with annular gear 320, but only when the modules are coupled as shown in FIG. 8. Otherwise, gear 338 slides into or out of engagement with gear 320 as overcarriage module 100 and undercarriage module 200 are vertically brought together and coupled or vertically separated and decoupled.

Annular gear 320 is the only element of the steering control linkage which extends between overcarriage module 100 and undercarriage module 200. In FIG. 2, it will be noted that there is an opening 304 in cover 230 which is sized to allow passage of this element. Plates 310, 330 are suitably positioned and mounted to their respective frames 120, 220 above and below opening 304 to provide the necessary alignment of shafts 312, 332.

In effect, the steering control linkage shown in FIG. 8 is interposed in the conventional linkage that would subsist between steering wheel and column assembly 300 and rack and pinion steering system 360 if vehicle 5 did not have a modular design. Shafts 312 and 332 turn as the steering column is turned and in this respect may be considered as simple extensions of the steering column. A primary point to note is that the steering control linkage will be automatically established when overcarriage module 100 and undercarriage module 200 are brought together.

Example 2—Brake Control Linkage

Figure 10:
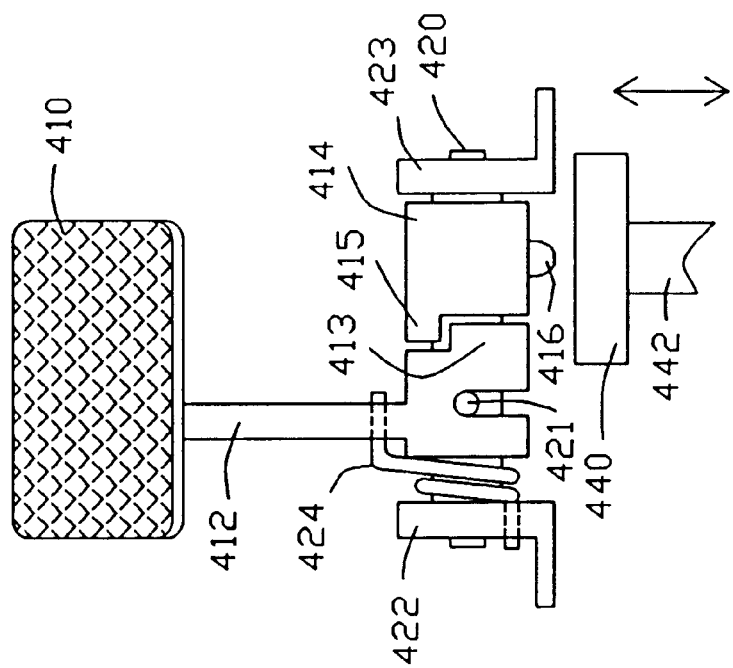
FIG. 10 is a front elevation view of the brake control linkage shown in FIG. 9.
Figure 9:
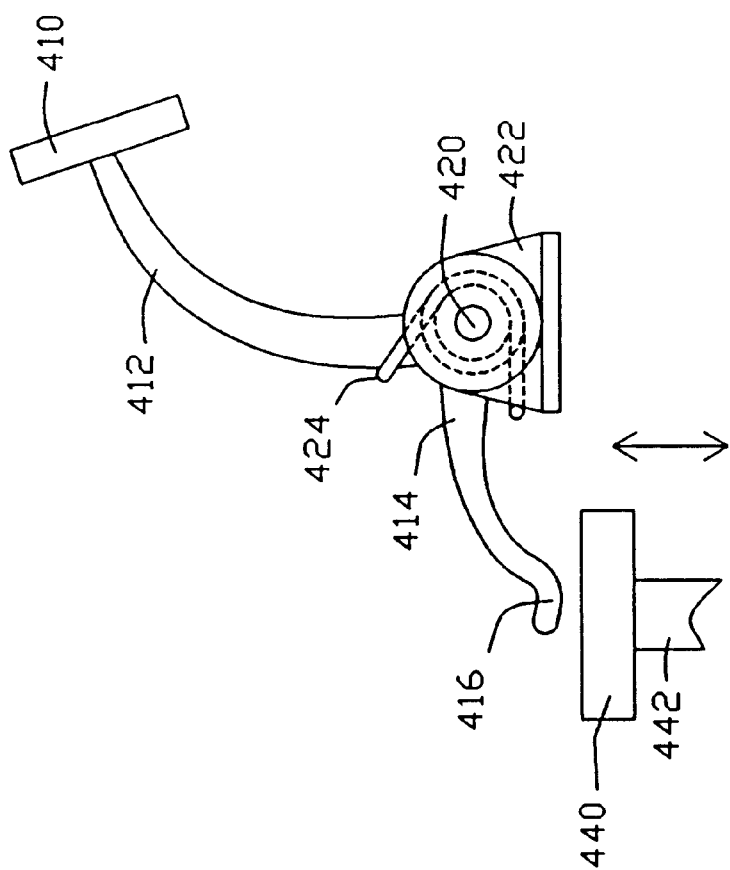
FIG. 9 is a side elevation view, partially cut-away, of a brake control linkage between the overcarriage module shown in FIG. 2 to the undercarriage module shown in FIG. 2.

Just as modular vehicle 5 normally will require a steering control linkage between overcarriage module 100 and undercarriage module 200 if the vehicle is controlled by a driver within overcarriage module 100 then, as well, a brake control linkage between the two modules normally will be required. FIGS. 9 and 10 illustrate basic aspects of a suitable brake control linkage between a brake pedal assembly in overcarriage module 100 and a brake activating mechanism in undercarriage module 200.

The brake pedal assembly comprises a pedal 410 pivotally mounted by arm 412 to shaft 420 for rotation about the longitudinal axis of shaft 420. Shaft 420 is supported by a pair of opposed flanges 422, 423 which are suitably secured within the overcarriage module. A spring 424 biases arm 412 (clockwise in FIG. 9) against pin 421 (FIG. 10) which extends radially outward from shaft 420. A brake arm 414 is secured to shaft 420 to rotate with the shaft. As can be seen, arm 414 extends to a distal end 416 positioned above a brake plate 440.

Brake plate 440 and shaft 442 extending downwardly therefrom form part of the brake activating mechanism in undercarriage module 200. They are positioned immediately below opening 400 in top cover 230 of the undercarriage module (see FIG. 2).

When brake pedal 410 is depressed, arm 412 rotates on shaft 420 until collar 413 at its lower end engages collar 415 of brake arm 414. Then, arm 412, arm 414 and shaft 420 rotate together. Distal end 416 of brake arm 414 descends through opening 400 to press on brake plate 400. The depression of brake plate 440 with shaft 442 operates a conventional braking system (not shown) in undercarriage module 200 in a manner exactly analogous to the depression of a brake pedal in a conventional vehicle. When brake pedal 410 is released, the process reverses. Spring 424 returns the pedal to the biased position shown in FIGS. 9 and 10.

As in the case of the steering control linkage, it will be noted that the brake control linkage will be automatically established when overcarriage module 100 and undercarriage module 200 are brought together.

Electrical And Other Operating Systems

Figure 11:
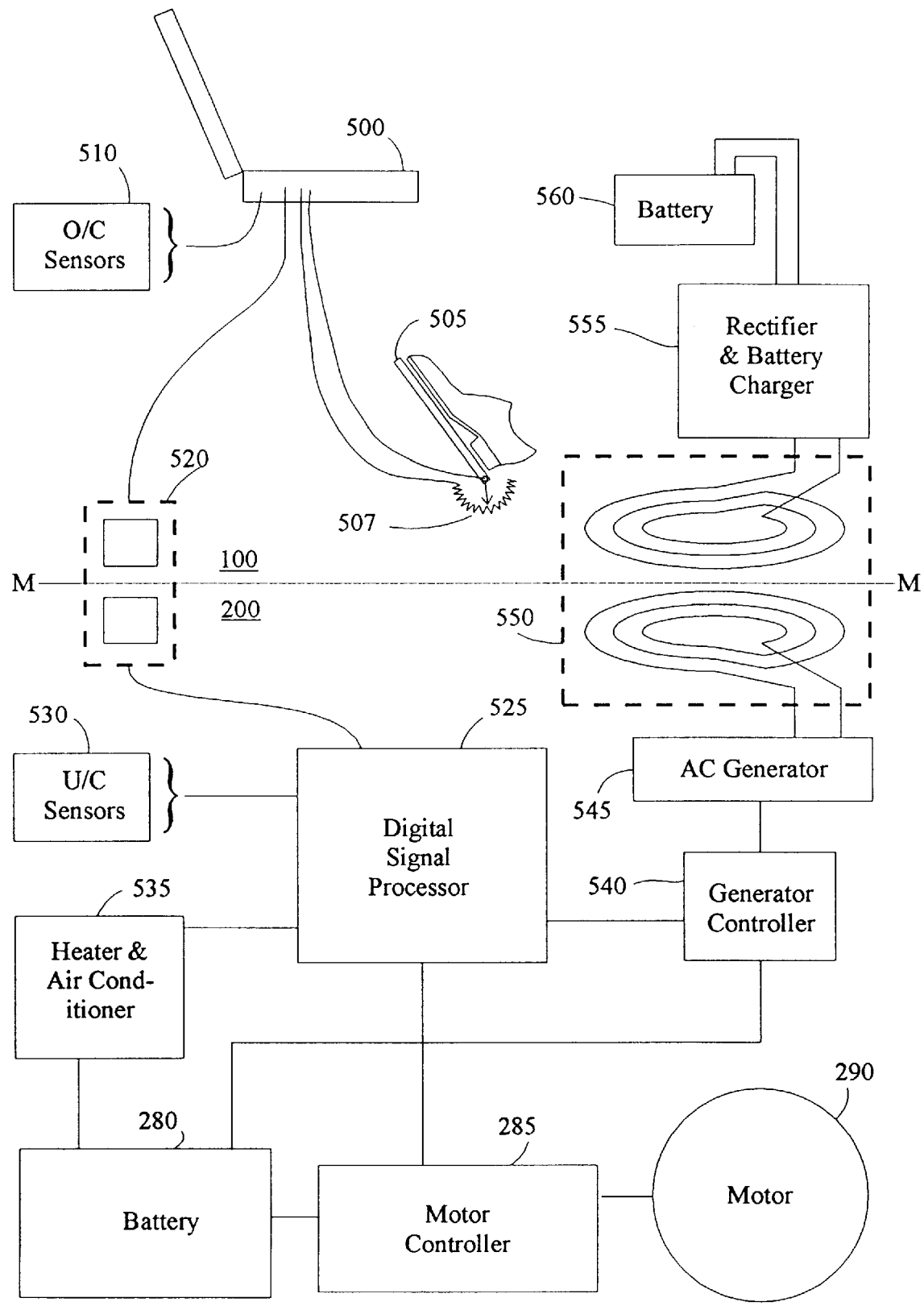
FIG. 11 is a schematic diagram illustrating electrical and other operating systems for the vehicle shown in FIG. 1.

By way of example, FIG. 11 illustrates in schematic form a basic electrical system for vehicle 5. As well, it illustrates an example of an electro-optical linkage between overcarriage module 100 and undercarriage module 200. Elements situate above interface M—M in FIG. 11 are carried by overcarriage module 100. Those situate below are by undercarriage module 200.

In undercarriage module 200, the electrical system includes a rechargeable battery 280 which is normally held in battery compartment 221 (FIG. 3) and which provides primary operating power for vehicle 5 (FIG. 1). Battery 280 is a conventional electric vehicle battery which provides operating power to motor 290 through motor controller 285. As well, it provides operating power to AC generator 545 through generator controller 540 and to heater and air conditioner 535. Motor controller 285, heater and air conditioner 535 and generator controller 540 are all controlled by digital signal processor 525. A means for recharging battery 280 is not shown, but is conventional.

It is generally contemplated that the features of heating and air conditioning are apt to consume a considerable amount of energy. Accordingly, heater and air conditioner 535 is located in undercarriage module 200. Of course, suitable ducting (not shown) across interface M—M is required to allow the benefits of heating and air conditioning to reach passengers in overcarriage module 100.

AC generator 545 delivers power over inductive power link 550 to rectifier and battery charger 555 which serves to maintain the charge of battery 560. Battery 560 is a relatively small secondary battery used to meet incidental low power demands of overcarriage module 560. Such low power demands may include the demands of laptop computer 500 (discussed below), interior lighting, a radio, and so forth. Battery 560 provides a means for meeting such demands even if power is not immediately available from battery 280 (for example, if overcarriage module 100 and undercarriage module 200 are decoupled).

Digital signal processor 525 receives control input signals from overcarriage module 100 via a bidirectional infra-red data link 520. As well, it receives input signals from undercarriage sensors 520 and communicates these signals to overcarriage module 100 over data link 520. Sensors 520 may include sensors adapted to monitor a variety of conditions such as vehicle speed, application of the brakes, battery voltage, battery temperature, and other conditions characteristic of undercarriage module 200 and its parts. In the case of brakes, a brake signal would be processed and provided as an output to motor controller 285 serving to interrupt power to motor 290 and rear road wheels 205 (FIG. 6). Thus, motor 290 would not work against mechanical braking actions of the driver. In more sophisticated systems, undercarriage sensors 520 may include means for sensing and receiving information such as traffic control information transmitted from external sources.

Control signals received by digital signal processor 525 over data link 525 may include, for example, accelerator or speed control signals that are processed and provided as an output to motor controller 285 to speed up or slow down motor 290. Likewise, they may include temperature control signals that are processed and provided as an output to heater and air conditioner 535 to turn heating or air conditioning on or off. Similarly, they may include control signals that are processed and provided as an output to generator controller 540 to switch power to AC generator 545 on or off.

Overcarriage module 100 includes a laptop computer 500 programmed to handle communications between the driver and undercarriage module 200. As illustrated in diagrammatic form, computer 500 receives an accelerator input signal as an analog voltage input from rheostat 507. The magnitude of such voltage is a function of the angular position of accelerator pedal 505. As well, computer 500 receives input signals from overcarriage sensors 510. Sensors 510 may include sensors adapted to monitor a variety of conditions including conditions which are often monitored in a conventional vehicle (e.g. interior temperature, whether any doors are ajar, whether seat belts are fastened, etc.). As well, sensors 510 may include sensors adapted to monitor conditions unique to the modular construction of vehicle 5 (e.g. whether overcarriage module 100 is securely coupled to an undercarriage module, whether support members 150 are fully extended or fully retracted, the voltage of battery 560, etc.). Through digital signal processor 525 and data link 520, computer 500 also receives input signals from undercarriage sensors 520. In addition, computer 500 may be programmed to receive keyboard input directly from the driver, for example, an input corresponding to the desired interior temperature of the vehicle, a cruise control input, etc.

All communications received by computer 500 are processed in a predetermined manner and its screen may provide numerous displays whereby the driver is kept fully informed about the status of the vehicle and its operating conditions.

Apart from output screen displays, computer 500 also provides as an output the control signals described above which are received by digital signal processor 525 over data link 525.

It will be fully appreciated by those skilled in the art, that various means may be devised to achieve desired communication and control linkages between overcarriage module 100 and undercarriage module 200. Thus, for example, the use of a link such as infra-red data link 520 is not essential. The same or other information could be transmitted over wire cables with suitable plugs that would be connected and disconnected either automatically or (less desirably) manually when the modules were coupled and uncoupled. Likewise, for example, the accelerator control could be a completely manual control as in the case of the manual brake control described in relation to FIGS. 9 and 10.

Generally, it is contemplated that vehicles in accordance with the present invention will typically include steering means for steering a pair of the wheels during vehicle travel. Further, the steering means will typically be controllable by a vehicle operator from within the overcarriage module—an operator who will also control the drive signals from within the overcarriage module. However, it is not considered that the invention is limited to vehicles having such features. For example, it is contemplated that vehicles having the modular construction called for by the present invention may operate on rails—and accordingly would not require a steering means. Alternatively, some vehicles may have only three wheels, only one of which is steerable. Similarly, it is contemplated that some vehicles having the modular construction of the present invention may be driven, or steered and driven, by remote control—and accordingly would not require a vehicle operator carried within the overcarriage module. In such cases, the overcarriage module may be limited to carrying passengers and/or cargo.

A variety of modifications, changes and variations to the invention are possible within the spirit and scope of the following claims. The invention should not be considered as restricted to the specific embodiments which have been described and illustrated with reference to the drawings.

I claim:

1. A modular vehicle for providing transportation, said vehicle comprising:
   (a) a preassembled self-supporting undercarriage module, said undercarriage module including:
      (i) wheels for providing full support for said undercarriage module on a travelling surface and for enabling travel of said vehicle on said surface;
      (ii) a compartment for holding a power source for supplying operating power to said vehicle, said compartment including a cover normally enclosing said power source from above, said cover being removable for permitting the servicing of said power source while said power source remains in situ in said compartment; and,
      (iii) means for directing controlled motive power from said power source to at least one of said wheels;
   (b) a preassembled self-supporting overcarriage module normally carried wholly atop said undercarriage module, said overcarriage module including control means linkable with said undercarriage module for controlling operation of said vehicle; and,
   (c) coupling means for releasably coupling said overcarriage module to said undercarriage module, said control means linking with said undercarriage module when said modules are so coupled.

2. A vehicle as defined in claim 1, wherein said coupling means permits said overcarriage module to be lifted upwardly from its coupled position with said undercarriage module upon the decoupling of said modules.

3. A vehicle as defined in claim 1, wherein said overcarriage module includes a plurality of support members for supporting said overcarriage module on an underlying support means when said overcarriage module is decoupled from said undercarriage module.

4. A vehicle as defined in claim 3, wherein each of said support members is movable between an extended position extending outwardly from said overcarriage module and a retracted position.

5. A vehicle as defined in claim 3, wherein each of said support members comprises a support arm and a wheel mounted to said support arm for riding on said underlying support means.

6. A vehicle as defined in claim 1, wherein said overcarriage module includes a plurality of support members for supporting said overcarriage module on a pair of spaced rails when said overcarriage module is decoupled from said undercarriage module, each of said support members comprising a support arm and a wheel mounted to said support arm for riding on one of said rails.

7. A vehicle as defined in claim 6, wherein each of said support members is movable between an extended position extending outwardly from said overcarriage module for engaging said rails and a retracted position.

8. A vehicle as defined in claim 1, wherein said power source comprises a rechargeable battery.

9. In a vehicle transportation system comprising a plurality of preassembled self-supporting vehicle undercarriage modules and a plurality of preassembled self-supporting vehicle overcarriage modules wherein:

any selected one of said overcarriage modules is releasably couplable wholly atop any selected one of said undercarriage modules for operation of said selected modules together as a vehicle;

each of said undercarriage modules includes an associated power source in the module for supplying vehicle operating power;

a first one of said overcarriage modules is releasably coupled to a first one of said undercarriage modules, the associated power source of said first undercarriage module being in need of maintenance service, a method of handling said first overcarriage module and said first undercarriage module at a predetermined site, said method comprising the steps of:
      (a) decoupling and separating said first overcarriage module from said first undercarriage module; then,
      (b) releasably coupling said first overcarriage module wholly atop a second one of said undercarriage modules, the associated power source of said second undercarriage module not being in need of maintenance service;
      (c) linking with said second undercarriage module a control means included with said first overcarriage module for controlling operation of said first overcarriage module and said second undercarriage module together as a vehicle;
      (d) providing maintenance service to the associated power source of said first undercarriage module while the same remains in situ in said first undercarriage module; and,
      (e) after providing said service, making said first undercarriage module available at said site for subsequent exchange with any of said other undercarriage modules.

10. A method as defined in claim 9 further including the steps of:
   (a) releasably coupling a second one of said overcarriage modules wholly atop said first undercarriage module after the associated power source of said first undercarriage module has received the maintenance service required;
   (b) linking with said first undercarriage module a control means included with said second overcarriage module for controlling operation of said second overcarriage module and said first undercarriage module together as a vehicle.

11. A method as defined in claim 9 wherein the associated power source of each of said undercarriage modules comprises a rechargeable battery.

12. A method as defined in claim 11 wherein the step of providing said required maintenance service comprises recharging the battery of the associated power source of said first undercarriage module.

13. In a vehicle transportation system comprising a plurality of preassembled self-supporting vehicle undercarriage modules and a preassembled self-supporting vehicle overcarriage module releasably coupled wholly atop a first one of said undercarriage modules for operation together with said first undercarriage module as a vehicle, each undercarriage module including an associated power source in said module for supplying vehicle operating power, each such power source being in need of periodic maintenance service, a method of exchanging a second one of said undercarriage modules for said first undercarriage module and providing maintenance service to the associated power source of said first undercarriage module, said method comprising the steps of:

(a) driving said first undercarriage module with said overcarriage module coupled thereto to a module exchange site;

(b) then decoupling said overcarriage module from said first undercarriage module;

(c) then separating said overcarriage module and said first undercarriage module to permit coupling alignment between said overcarriage module and said second undercarriage module;

(d) then positioning said overcarriage module and said second undercarriage module in coupling alignment;

(e) then releasably coupling said overcarriage module wholly atop said second undercarriage module, and linking with said second undercarriage module a control means included with said overcarriage module for controlling operation of said overcarriage module and said second undercarriage module together as a vehicle;

(f) then driving said second undercarriage module with said overcarriage module coupled thereto away from said exchange site; and, (g) after said separating step, providing maintenance service to said associated power source of said first undercarriage module while the same remains in situ in said first undercarriage module and then making said first undercarriage module available for subsequent exchange with any of said other undercarriage modules.

14. A method as defined in claim 13, wherein said separating step comprises the step of lifting said overcarriage module upwardly from its coupled position with said first undercarriage module, then moving said first undercarriage module from beneath said overcarriage module.

15. A method as defined in claim 13, wherein said positioning step comprises the steps of:

(a) moving said second undercarriage module to a position beneath said overcarriage module while said overcarriage module remains lifted;

(b) then lowering said overcarriage module on said undercarriage module.

16. A method as defined in claim 13, wherein said overcarriage module includes a plurality of support members for supporting said overcarriage module on a pair of spaced rails situate at said exchange site, each of said support members comprising a support arm and a wheel mounted to said support arm for riding on one of said rails, and wherein said separating step comprises the steps of:

(a) aligning said wheels with said rails to ride on said rails;

(b) advancing said overcarriage module o n said rails while progressively vertically separating said overcarriage module from its coupled position with said first undercarriage module.

17. A method as defined in claim 16, wherein each of said support members is movable between an extended position extending outwardly from said overcarriage module and a retracted position, and wherein said aligning step comprises the movement of each support member from its retracted position to its extended position.

* * * * *